United States Patent
Berryann et al.

(10) Patent No.: US 9,200,592 B2
(45) Date of Patent: Dec. 1, 2015

(54) MECHANISM FOR TURBINE ENGINE START FROM LOW SPOOL

(75) Inventors: Andrew P. Berryann, Coventry, CT (US); Gabriel L. Suciu, Glastonbury, CT (US)

(73) Assignee: United Technologies Corporation, Hartford, CT (US)

(*) Notice: Subject to any disclaimer, the term of this patent is extended or adjusted under 35 U.S.C. 154(b) by 1068 days.

(21) Appl. No.: 13/170,340

(22) Filed: Jun. 28, 2011

(65) Prior Publication Data
US 2013/0000317 A1    Jan. 3, 2013

(51) Int. Cl.
| | | |
|---|---|---|
| *F02K 3/00* | (2006.01) | |
| *F02K 3/04* | (2006.01) | |
| *F01D 19/00* | (2006.01) | |
| *F02C 3/113* | (2006.01) | |
| *F02C 7/36* | (2006.01) | |
| *F02K 3/06* | (2006.01) | |
| *F02K 3/072* | (2006.01) | |
| *F02K 3/02* | (2006.01) | |

(52) U.S. Cl.
CPC . *F02K 3/04* (2013.01); *F01D 19/00* (2013.01); *F02C 3/113* (2013.01); *F02C 7/36* (2013.01); *F02K 3/00* (2013.01); *F02K 3/02* (2013.01); *F02K 3/06* (2013.01); *F02K 3/072* (2013.01)

(58) Field of Classification Search
CPC ............. F02K 3/00; F02K 3/02; F02K 3/025; F02K 3/04; F02K 3/06; F02K 3/062; F02K 3/065; F02K 3/068; F02K 3/072; F02K 3/075
USPC ................ 60/226.1, 226.3, 262, 268, 39.162, 60/39.163, 778, 788
See application file for complete search history.

(56) References Cited

U.S. PATENT DOCUMENTS

| | | | | |
|---|---|---|---|---|
| 2,547,660 A | * | 4/1951 | Prince | 60/788 |
| 3,057,155 A | * | 10/1962 | Rizk | 60/788 |
| 3,842,597 A | * | 10/1974 | Ehrich | 60/226.1 |
| 5,152,141 A | * | 10/1992 | Rumford et al. | 60/778 |
| 5,349,814 A | * | 9/1994 | Ciokajlo et al. | 60/226.1 |
| 5,687,561 A | * | 11/1997 | Newton | 60/226.1 |
| 5,694,765 A | * | 12/1997 | Hield et al. | 60/39.163 |
| 5,845,483 A | * | 12/1998 | Petrowicz | 60/788 |
| 6,672,049 B2 | | 1/2004 | Franchet et al. | |
| 6,851,255 B2 | * | 2/2005 | Aitchison et al. | 60/39.83 |

(Continued)

FOREIGN PATENT DOCUMENTS

WO    2006060014 A1    6/2006

OTHER PUBLICATIONS

Dornheim, M., "Rebalancing Act Rolls-Royce breaks tradition by driving Boeing 787 accessories from IP spool," Aviation Week & Space Technology, Mar. 28, 2005.

(Continued)

*Primary Examiner* — Phutthiwat Wongwian
*Assistant Examiner* — Michael B Mantyla
(74) *Attorney, Agent, or Firm* — Kinney & Lange, P.A.

(57) ABSTRACT

A gas turbine engine includes a high spool, a low spool mechanically connected to a fan, a gear system, an actuator, and a starter. The gear system is actuable to engage and disengage the low spool to and from the high spool. The actuator is connected to the gear system for selectively engaging and disengaging the gear system. The starter is connected to the low spool and can drive rotation of the high spool through the low spool when the gear system is engaged.

16 Claims, 5 Drawing Sheets

(56) References Cited

U.S. PATENT DOCUMENTS

| | | | |
|---|---|---|---|
| 6,895,741 B2 | 5/2005 | Rago et al. | |
| 7,434,406 B2* | 10/2008 | Herlihy et al. | 60/788 |
| 7,481,062 B2 | 1/2009 | Gaines et al. | |
| 7,552,582 B2* | 6/2009 | Eick et al. | 60/39.163 |
| 7,788,898 B2 | 9/2010 | Kern et al. | |
| 8,015,828 B2* | 9/2011 | Moniz et al. | 60/786 |
| 8,461,704 B2* | 6/2013 | McLoughlin et al. | 290/40 C |
| 8,505,308 B2* | 8/2013 | Walitzki et al. | 60/772 |
| 2006/0137355 A1* | 6/2006 | Welch et al. | 60/772 |
| 2006/0254253 A1 | 11/2006 | Herlihy et al. | |
| 2007/0022735 A1* | 2/2007 | Henry et al. | 60/39.162 |
| 2007/0234739 A1 | 10/2007 | Delaloye et al. | |
| 2007/0289310 A1 | 12/2007 | Dooley et al. | |
| 2008/0095615 A1* | 4/2008 | Bradbrook et al. | 415/145 |
| 2008/0200299 A1 | 8/2008 | Russ | |
| 2009/0015011 A1 | 1/2009 | Colin et al. | |
| 2009/0039653 A1* | 2/2009 | Beutin et al. | 290/52 |
| 2009/0064683 A1 | 3/2009 | Moniz et al. | |
| 2009/0235638 A1* | 9/2009 | Jain et al. | 60/204 |
| 2012/0233980 A1* | 9/2012 | Heathco | 60/226.1 |
| 2013/0183136 A1* | 7/2013 | Roberge et al. | 415/1 |

OTHER PUBLICATIONS

European Search Report dated Feb. 17, 2015 for corresponding European Application No. 12169823.7.

* cited by examiner

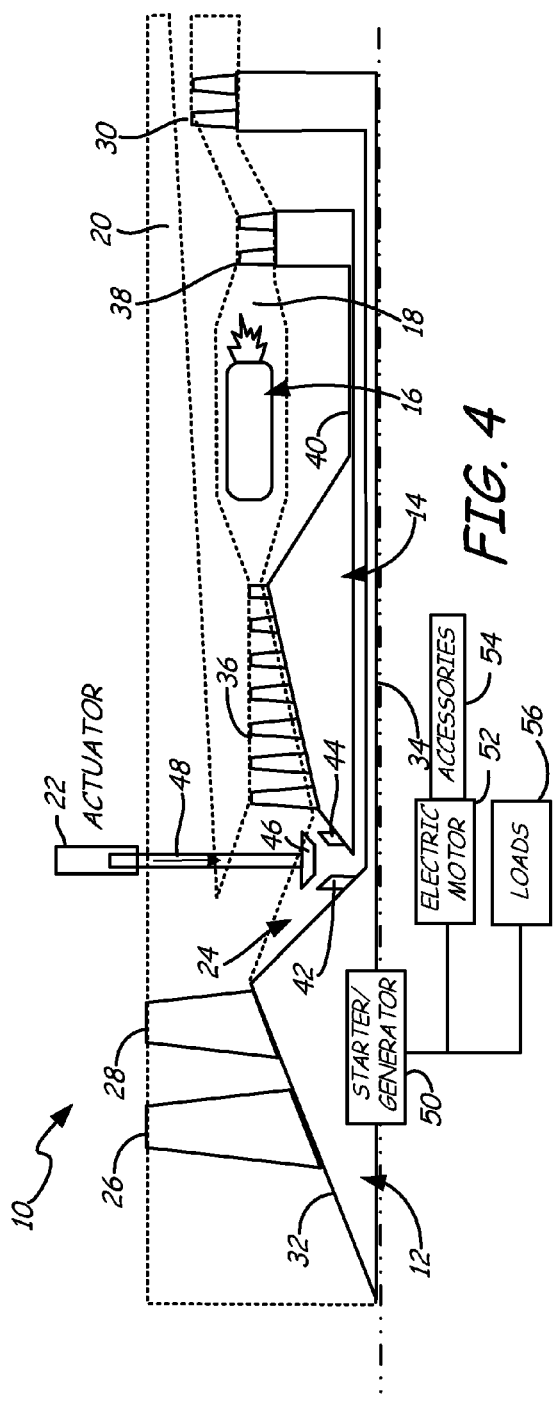
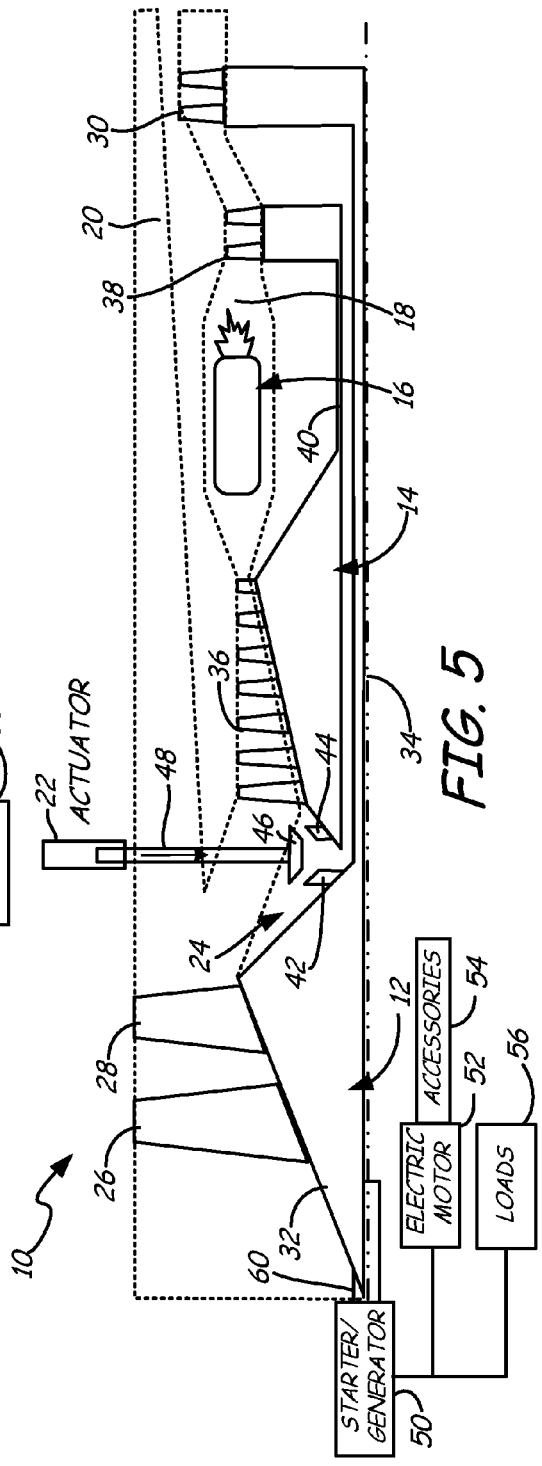

MECHANISM FOR TURBINE ENGINE START FROM LOW SPOOL

BACKGROUND

The present invention relates to gas turbine engines, and in particular, to starting of a gas turbine engine. In gas turbine engines with multiple spools, the engine is typically started by rotating a high spool and then lighting a combustor when the high spool reaches a suitable speed. In many gas turbine engines, a starter is used to rotate the high spool prior to lighting the combustor. After the combustor has been lit, the gas turbine engine can operate without assistance from the starter. A starter is typically not connected to a low spool, which is typically much larger than the high spool, has a substantially larger inertia than that of the high spool, and has a slower rotational speed than that of the high spool.

In some gas turbine engines, a motor/generator is connected to a gearbox, which is connected to the high spool. This motor/generator can be used as a starter motor to drive the gearbox to rotate the high spool for starting the gas turbine engine. Such an arrangement typically requires a relatively large gearbox connected to the high spool. This can be undesirable in applications where space is limited. Moreover, such an arrangement also limits the location and operation of the motor/generator.

SUMMARY

According to the present invention, a gas turbine engine includes a high spool, a low spool mechanically connected to a fan, a gear system, an actuator, and a starter. The gear system is actuable to engage and disengage the low spool to and from the high spool. The actuator is connected to the gear system for selectively engaging and disengaging the gear system. The starter is connected to the low spool and can drive rotation of the high spool through the low spool when the gear system is engaged.

Another embodiment of the present invention is a method of starting a gas turbine engine having a combustor, a high spool, and a low spool mechanically connected to a fan. The method includes rotating the low spool via a starter, engaging a gear system to connect the high spool to the low spool so as to drive rotation of the high spool in response to rotation by the low spool, lighting the combustor, and disengaging the gear system such that the high spool can rotate independently from the low spool.

BRIEF DESCRIPTION OF THE DRAWINGS

FIG. 4 is a side schematic view of a portion of the gas turbine engine of FIG. 1, with a motor/generator mounted in a fan hub.

FIG. 5 is a side schematic view of a portion of the gas turbine engine of FIG. 1, with the motor/generator mounted on a shaft forward of the fan hub.

DETAILED DESCRIPTION

Figure 1:
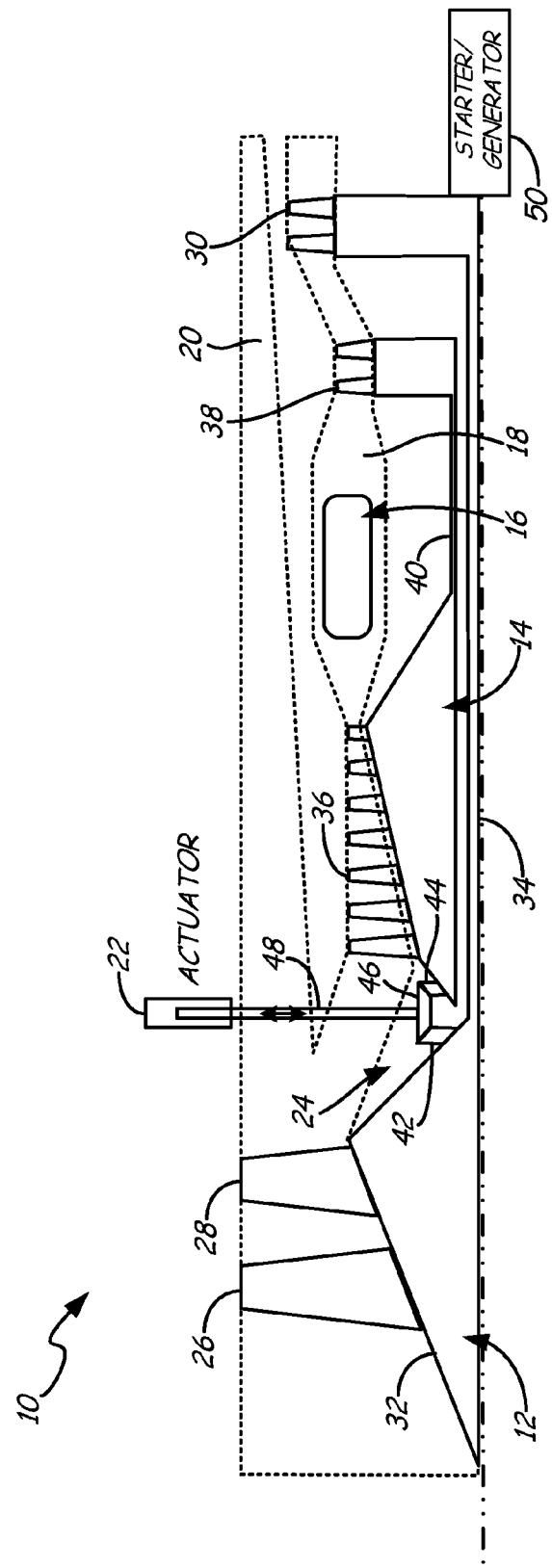
FIG. 1 is a schematic view of a portion of a gas turbine engine with a gear system engaged.

FIG. 1 is a side schematic view of gas turbine engine 10, including low spool 12, high spool 14, combustor 16, main flow path 18, fan bypass flow path 20, actuator 22, and gear system 24. Low spool 12 includes fan first stage 26, fan second stage 28, low pressure turbine 30, and fan hub 32, all mechanically connected by low pressure shaft 34. In alternative embodiments, low spool 12 can include a low pressure compressor (not shown). In further alternative embodiments, low spool 14 can be mechanically connected to fan first stage 26 and/or fan second stage 28 via a reduction gear system (not shown). High spool 14 includes high pressure compressor 36 and high pressure turbine 38, mechanically connected by high pressure shaft 40. Low spool 12 and high spool 14 each rotate independently about centerline axis $C_L$ in operation, except when gear system 24 is engaged.

Gear system 24 includes bull gear 42, bull gear 44, and bevel (pinion) gear 46. Bull gear 42 is connected to low spool 12 so as to rotate with low spool 12. Bull gear 44 is connected to high spool 14 so as to rotate with high spool 14. Bevel gear 46 is connected to actuator 22 via shaft 48. Shaft 48 is a tower shaft extending substantially radially outward from centerline axis $C_L$. Actuator 22 is positioned radially outward of fan bypass flow path 20. Actuator 22 selectively actuates bevel gear 46 radially inward and outward to engage and disengage bull gears 42 and 44. As illustrated in FIG. 1, bevel gear 46 is in a position engaged with bull gears 42 and 44 such that high spool 14 rotates in a direction opposite that of low spool 12 when low spool 12 rotates. In alternative embodiments, gear system 24 can include additional gears and be configured differently than as illustrated. Gear system 24 can be a reduction gear system allowing low spool 12 to rotate at a different rotational speed from that of high spool 14 when gear system 24 is engaged. In one embodiment, gear system 24 can have a relatively high gear ratio such that high spool 14 (which has a relatively small inertia) can rotate faster than low spool 12 (which has a relatively large inertia) when gear system 24 is engaged. In some embodiments, gear system 24 can have a gear ratio of about 2:1 to about 10:1. In other embodiments, gear system 24 can have nearly any gear ratio suitable for the application.

In the embodiment illustrated in FIG. 1, motor/generator 50 is connected to low spool 12, aft of low pressure turbine 30. Motor/generator 50 can be operated as a starter motor to drive low spool 12 or as a generator driven by low spool 12. When gear system 24 is engaged, motor/generator 50 can drive rotation of low spool 12, which in turn drives rotation of high spool 14 via gear system 24. When high spool 14 reaches a suitable rotational speed (sometimes referred to as "light-off speed"), fuel is sent to combustor 16 and ignited. Actuator 22 then disengages gear system 24 such that high spool 14 can rotate independently from low spool 12. Gas turbine engine 10 can then operate normally as described with respect to FIG. 2.

Figure 2:
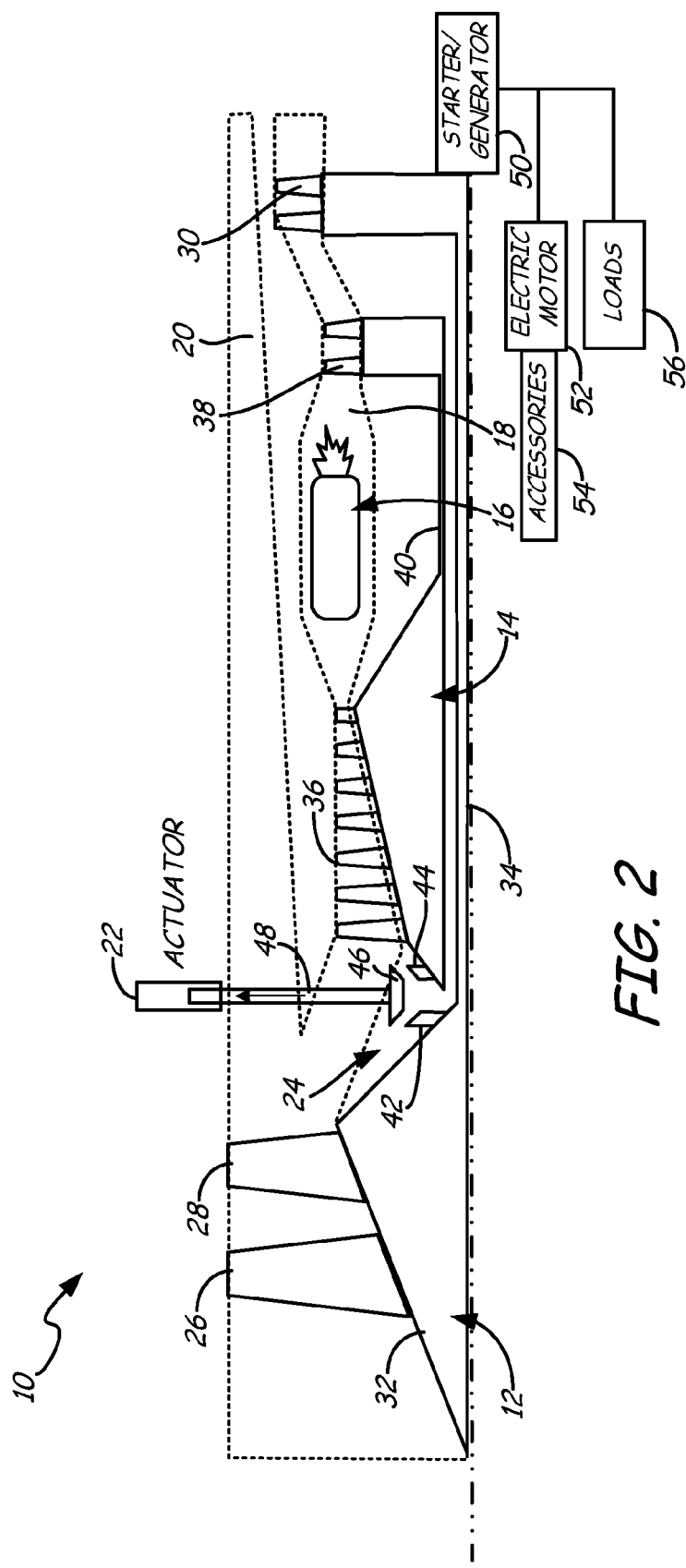
FIG. 2 is a side schematic view of a portion of the gas turbine engine of FIG. 1, with the gear system disengaged.

FIG. 2 is a side schematic view of gas turbine engine 10 with gear system 24 in a disengaged position. Air enters gas turbine engine 10 at fan first stage 26 and is directed to main flow path 18 and fan bypass flow path 20. Air in main flow path 18 is compressed by high pressure compressor 36, mixed with fuel and combusted in combustor 16, and then passed through high pressure turbine 38 and low pressure turbine 30 to drive rotation of high spool 14 and low spool 12, respectively. Because actuator 22 has disengaged gear system 24, high spool 14 can rotate independently from low spool 12. When operating normally, low spool 12 drives motor/generator 50 to generate electric power. Electric power from motor/ generator 50 can be used to power various components, including one or more electric motors 52 for driving one or more engine accessories 54, such as pumps. By powering engine accessories 54 electrically, no accessory gearbox is needed to be connected to and driven by high spool 14. Motor/generator 50 can also power other electrical loads 56, such as compressors, lights, or other electrical devices.

In the event of an in-flight flameout of combustor 16, combustor 16 can be relit if high spool 14 can be returned to a suitable rotational speed. If, however, low spool 12 and high spool 14 are rotating at substantially different rotational speeds, gear system 24 can be damaged by an attempt to re-engage bevel gear 46 with bull gears 42 and 44. Motor/generator 50 can be used to control rotational speed of low spool 12 to substantially match that of high spool 14 prior to engaging gear system 24. For example, if low spool 12 is rotating slower than high spool 14, motor/generator 50 can act as a motor to increase rotational speed of low spool 12. If, however, low spool 12 has a greater rotational speed than that of high spool 14, then motor/generator 50 can act as a generator to extract power from and slow low spool 12. Once bull gears 42 and 44 are spinning at substantially the same rotational speed, actuator 22 can engage pinion gear 46, which drives high spool 14 to a suitable speed for combustor 16 to be relit. Gas turbine engine 10 can then continue to operate normally. Thus, motor/generator 50, low spool 12, and gear system 24 can be used to start gas turbine engine 10 prior to takeoff of an aircraft (not shown) to which gas turbine engine 10 is attached, or during flight of an aircraft (not shown) to which gas turbine engine 10 is attached.

Figure 3:
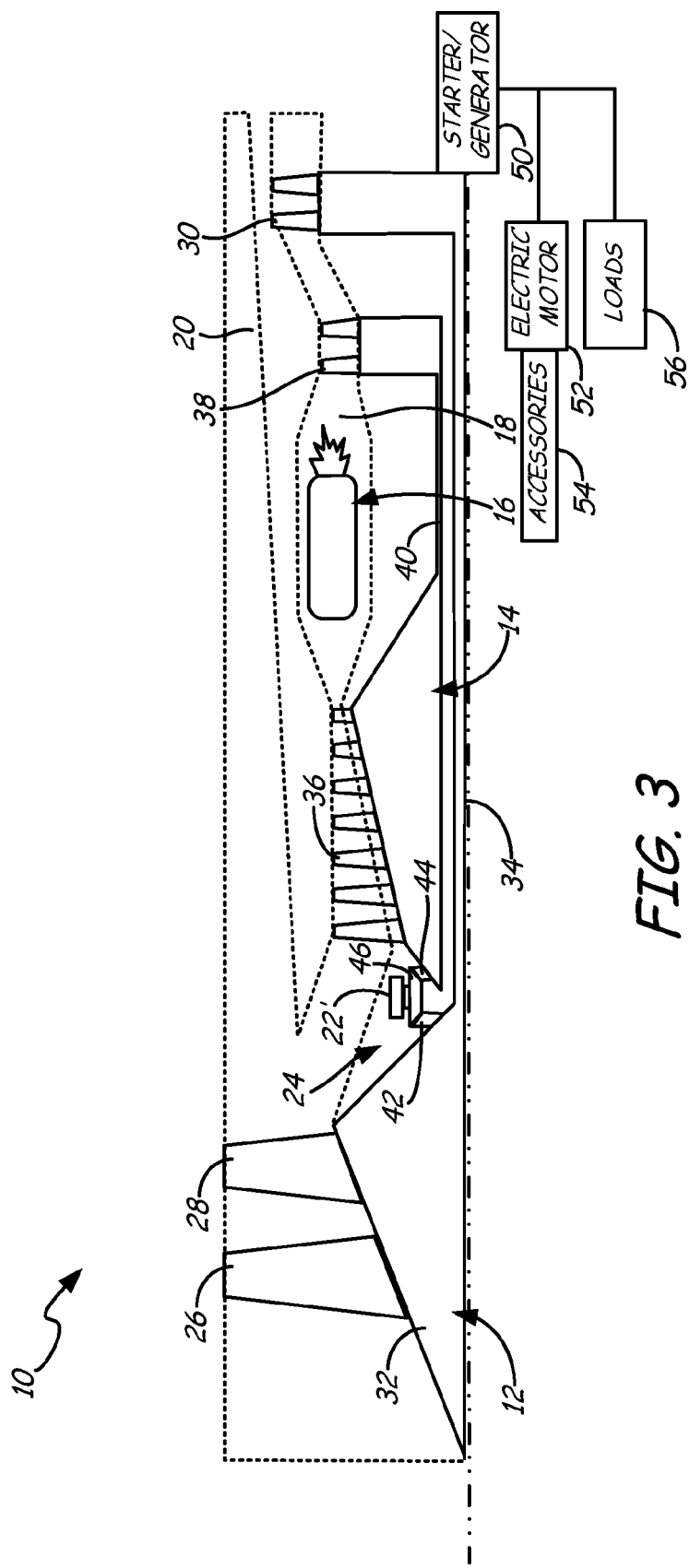
FIG. 3 is a side schematic view of a portion of the gas turbine engine of FIG. 1, with an actuator of the gear system positioned radially inward of a main flow path.

FIG. 3 is a side schematic view of gas turbine engine 10 with actuator 22' positioned radially inward of main flow path 18. Actuator 22' is similar to actuator 22 (shown in FIGS. 1 and 2) except actuator 22' is sized to be positioned inward of main flow path 18. Actuator 22' can actuate bevel gear 46 without use of a relatively long shaft 48 (shown in FIGS. 1 and 2).

FIG. 4 is a side schematic view of gas turbine engine 10, with motor/generator 50 mounted in a space within fan hub 32. When mounted in fan hub 32, motor/generator 50 can drive and be driven by low spool 12 as described with respect to FIGS. 1 and 2.

FIG. 5 is a side schematic view of gas turbine engine 10, with motor/generator 50 mounted forward of fan hub 32. Shaft 60 connects motor/generator 50 to fan hub 32. When mounted forward of fan hub 32, motor/generator 50 can drive and be driven by low spool 12 as described with respect to FIGS. 1 and 2.

Figure 6:
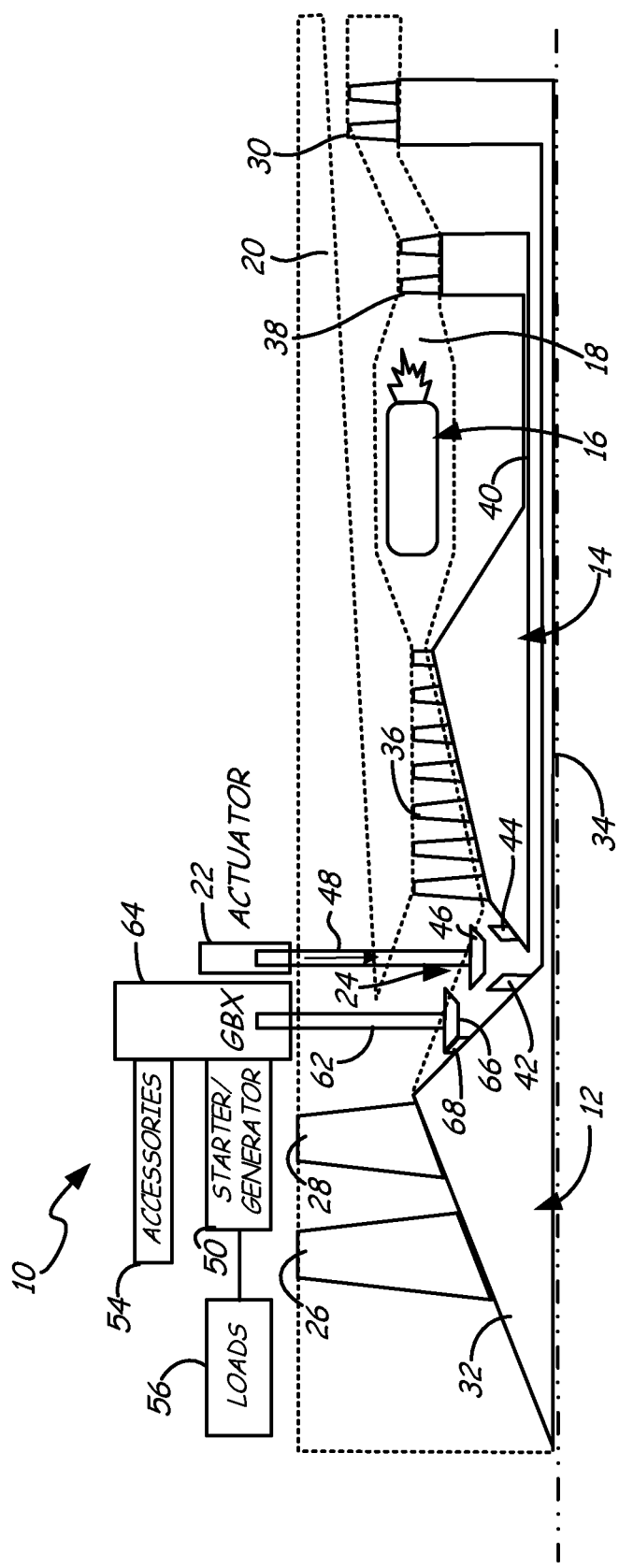
FIG. 6 is a side schematic view of a portion of the gas turbine engine of FIG. 1, with the motor/generator connected to a low spool via a tower shaft.

FIG. 6 is a side schematic view of gas turbine engine 10, with motor/generator 50 connected to low spool 12 via shaft 62. Shaft 62 is a tower shaft extending from gearbox 64 to pinion gear 66, which connects to bull gear 68, which is mounted on fan hub 32. Shaft 62 is separate and independent from shaft 48, except when both are connected to low spool 12. Motor/generator 50 is mounted to gearbox 64. When mounted to gearbox 64, motor/generator 50 can drive and be driven by low spool 12 as described with respect to FIGS. 1 and 2. In the embodiment shown in FIG. 6, engine accessories 54 can be mounted to and powered by gearbox 64 as illustrated, or can be driven by one or more electric motors (as illustrated in FIG. 2). Gearbox 64 can be a standard transmission gearbox or a variable transmission gearbox.

The present invention can have several benefits and advantages. By driving motor/generator 50 from low spool 12, no motor/generator needs to be driven by high spool 14. This can allow high spool 14 to operate without an attached accessory gearbox which would otherwise take up valuable space in gas turbine engine 10. Instead, the accessory gearbox can be moved to low spool 12, or omitted, and motor/generator 50 can be positioned in one of several beneficial positions. Also, high spool 14 need not be designed with extra surge margin to accommodate power extraction associated with an attached motor/generator. Low spool 12 has a substantially larger inertia than high spool 14, and can be more tolerant to power extraction by motor/generator 50. By using actuator 22 and gear system 24 to engage and disengage low spool 12 to and from high spool 14, motor/generator 50 can be used to rotate high spool 14, allowing for starting and restarting of gas turbine engine 10 without a separate high spool starter. Gear system 24 can have a relatively high gear ratio, allowing motor/generator 50 to cause high spool 14 to rotate at a relatively high speed without having to rotate low spool 12 (and one or more connected fan stages) at that same high speed. Overall, motor/generator 50 can be used to start gas turbine engine 10 on the ground or to perform a restart in the air. When providing an in-flight restart, motor/generator 50 can control rotational speeds of low spool 12 prior to engaging gear system 24 to avoid damaging gear system 24 due to dissimilar gear speeds. These and other advantages can be possible in one or more of the various embodiments of the present invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, gas turbine engine 10 can include more or fewer fan stages, compressor stages, and turbine stages than those illustrated. Moreover, gas turbine engine 10 can include one or more intermediate spools (not shown), so long as motor/generator 50 is connected to low spool 12 and so long as gear system 24 can be selectively engaged to connect low spool 12 with high spool 14.

The invention claimed is:

1. A gas turbine engine, comprising:
   a high spool mechanically connected to a high spool bull gear;
   a low spool mechanically connected to a fan and a low spool bull gear;
   a gear system actuable to engage and disengage the low spool bull gear to and from the high spool bull gear with a bevel gear;
   an actuator connected to the bevel gear for selectively engaging and disengaging the gear system; and
   a motor/generator connected to the low spool, wherein the motor/generator is configured to control the rotational speed of the low spool bull gear to a point where the rotational speed of the low spool bull gear substantially matches the rotational speed of the high spool bull gear, wherein the actuator is controlled to engage the low spool bull gear and high spool bull gear by the bevel gear when the low spool bull gear and the high spool bull gear have the same rotational speed to allow rotation of the high spool to be driven by the motor/generator through the low spool.

2. The gas turbine engine of claim 1, wherein no accessory gearbox is connected to the high spool.

3. The gas turbine engine of claim 2, wherein an accessory gearbox is connected to and driven by the low spool.

4. The gas turbine engine of claim 1, wherein the motor/generator is connected to the low spool aft of a low pressure turbine.

5. The gas turbine engine of claim 1, wherein the motor/generator is connected to the low spool forward of a fan hub via a shaft connected to the fan hub.

6. The gas turbine engine of claim 1, wherein the motor/generator is mounted in a fan hub of the low spool.

7. The gas turbine engine of claim 1, and further comprising:
a tower shaft connecting the actuator and the bevel gear for actuating the bevel gear, wherein the actuator is positioned radially outward of a fan flow path of the gas turbine engine.

8. The gas turbine engine of claim 1, wherein the actuator is connected to the bevel gear for actuating the bevel gear and is positioned radially inward of a main flow path of the gas turbine engine.

9. A method of starting a gas turbine engine having a combustor, a high spool mechanically connected to a high spool bull gear, a low spool mechanically connected to a fan and a low spool bull gear, a gear system including a bevel gear capable of connecting the high spool bull gear and the low spool bull gear, and an actuator capable of engaging and disengaging the high spool bull gear and low spool bull gear, the method comprising:
rotating the low spool and low spool bull gear via a starter that is configured to control the rotational speed of the low spool bull gear to substantially match the rotational speed of the high spool bull gear to allow the gear system to connect the low spool to the high spool by connecting the low spool bull gear and the high spool bull gear with the bevel gear;
engaging the gear system with the actuator to connect the high spool bull gear to the low spool bull gear with the bevel gear so as to drive rotation of the high spool in response to rotation by the low spool;
lighting the combustor; and
disengaging the gear system such that the high spool can rotate independently from the low spool.

10. The method of claim 9, wherein the starter comprises a motor/generator mechanically connected to the low spool, and wherein the motor/generator is driven via the low spool to generate electric power when the gear system is disengaged.

11. The method of claim 10, wherein the motor/generator controls rotational speeds of a gear in the gear system prior to engaging the gear system.

12. The method of claim 10, and further comprising:
powering a plurality of electric motors via electric power from the motor/generator; and
driving a plurality of engine accessories via the plurality of electric motors.

13. The method of claim 12, wherein no accessory gearbox is driven by the high spool.

14. The method of claim 9, and further comprising:
rotating the high spool in a direction opposite that of the low spool when the gear system is engaged.

15. The method of claim 9, wherein engaging the gear system comprises:
moving the bevel gear radially inward to engage the low spool bull gear and the high spool bull gear.

16. The method of claim 9, wherein the method occurs prior to takeoff of an aircraft to which the gas turbine engine is attached.

\* \* \* \* \*